(12) United States Patent
Yin et al.

(10) Patent No.: US 7,012,965 B2
(45) Date of Patent: Mar. 14, 2006

(54) HIGH SPEED LEADING OR TRAILING BIT VALUE DETECTION

(75) Inventors: Shi-Huang Yin, Natick, MA (US); Michael K. Gowan, Framingham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 838 days.

(21) Appl. No.: 10/036,117

(22) Filed: Dec. 26, 2001

(65) Prior Publication Data

US 2003/0118118 A1 Jun. 26, 2003

(51) Int. Cl.
*H04B 14/04* (2006.01)

(52) U.S. Cl. .................................. 375/242
(58) Field of Classification Search ............. 375/242, 375/365, 366, 368, 240, 240.23, 253, 246; 370/512, 514
See application file for complete search history.

(56) References Cited

U.S. PATENT DOCUMENTS 5,450,451 A * 9/1995 Isozaki .................. 375/273
6,128,358 A * 10/2000 Urata .................... 375/366
6,259,753 B1 * 7/2001 Watanabe ................ 375/368
6,298,087 B1 * 10/2001 Luna et al. ............ 375/240.25
6,560,288 B1 * 5/2003 Gilbert et al. ......... 375/240.23
2001/0022825 A1 * 9/2001 Watanabe ................ 375/368

* cited by examiner

*Primary Examiner*—Khanh C. Tran

(57) ABSTRACT

A method and digital circuit to locate and output a binary encoded position of a leading one in an input string of bits. A plurality of input encoders are used, each configured to accept as input equal length sub-strings of the original input string and further configured to generate a binary encoded position of the leading one within the sub-string. Bit value detectors are also used to indicate if a one exists within each sub-string. An encoder arbitrator selects the binary position output of the binary encoder that contains the most significant one of the original input and forwards this binary position to the final output. This position is concatenated with the output of a most significant sub-string encoder that generates a binary encoded representation of the most significant sub-string containing the leading one. The concept is fully extendible to detection of leading or trailing ones or zeroes.

44 Claims, 6 Drawing Sheets

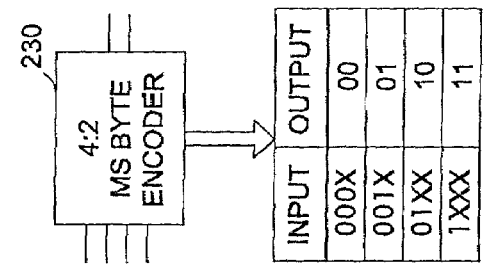
Fig. 4
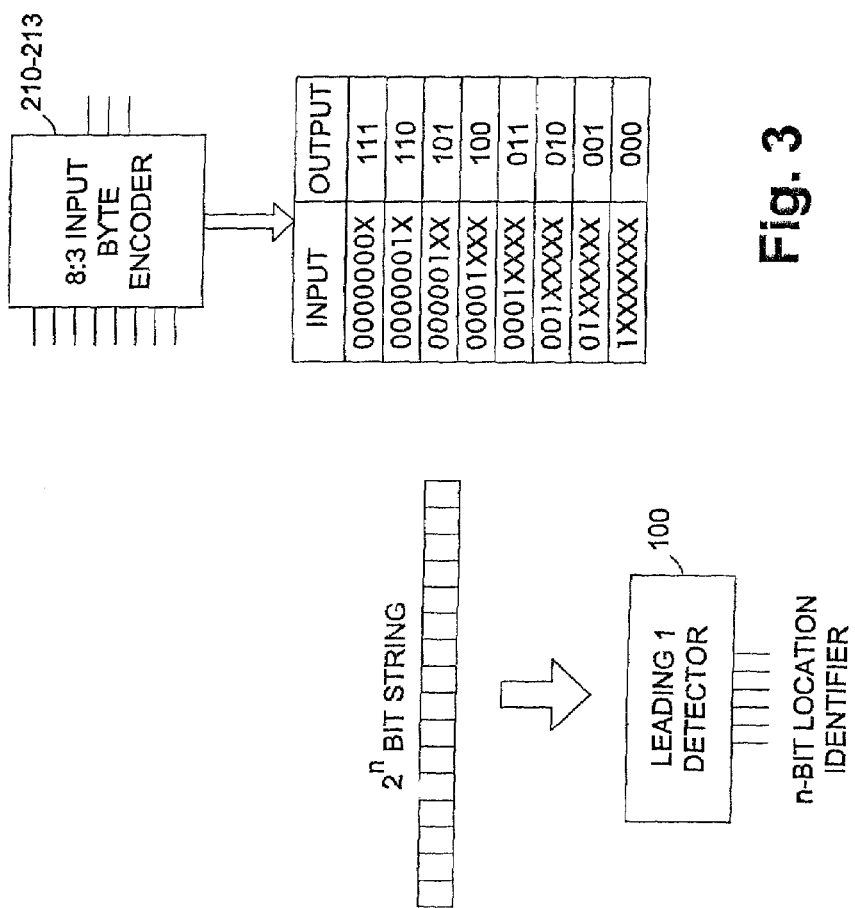
Fig. 3
Fig. 1

HIGH SPEED LEADING OR TRAILING BIT VALUE DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to the detection of bit values in a bit string. More specifically, the invention relates to identifying and generating the location of a leading or trailing one or zero in a string of binary numbers.

2. Background of the Invention

In the field of computer science and binary number processing, there are many occasions in which it is necessary to locate the leading or trailing non-zero bit in a string of bits. For example, the normalization procedure in floating point processors sometimes involves a leftward shift of a string of bits up to the first significant bit. This requires some prior knowledge of the position of the most significant non-zero bit thereby allowing non-significant zeroes to be discarded while retaining relevant data. Similarly, in right shift or truncation scenarios, processors need to keep track of the location of the least significant non-zero bit to maintain data integrity.

Another example of a need to determine the location of low order non-zero bits is in "sticky bit" calculations. These calculations require knowledge of the position of non-zero bits at the least significant end of the bit stream. In floating point processors, data bit streams commonly use guard and round bits, which are two bits of precision that are used in calculations. The sticky bit is beyond (less significant than) the guard and round bits and provides an indication of the value of lesser significant bits that are not kept. If a non-zero value is shifted into the sticky bit position, that sticky bit remains a one ("sticks" at one), despite further shifts.

Other examples of when a leading one must be identified certainly exist. For instance, in variable length coding, long strings of ones or zeros may be eliminated from binary data to compress the size of digital transmissions. These long strings of continuous bits are replaced by a marker that indicates the value and quantity of bits being replaced. Before replacing the string of bits, the coding scheme must determine the number of continuous bits in a given string. This can be done by searching for the first bit change in a string of bits. By determining the location where a string of continuous ones or zeros ends, this may eliminate the need to count the individual bits until a bit change is encountered.

Conventional methods of locating a leading bit value in a string of bits are cumbersome and time-consuming. The most trivial solution (as alluded to above) involves shifting bits out of a register one by one until a bit change is located. This brute force method of locating a leading one or zero quickly becomes impractical in scanning large strings of bits for leading ones and zeros.

Another conventional method involves parallel, cascaded comparisons of adjacent bits. As an example of the simplest form of searching for a leading one, this method compares adjacent pairs of bits and if the more significant bit is a one, the less significant bit is forced to zero. Otherwise, if the more significant bit is a zero, the less significant bit value is retained. In the next cascaded step, the previously checked pairs of bits are grouped together and compared in much the same way, i.e., leaving the most significant one intact and forcing all others to zero. This process is repeated until a single bit has a value of one. The position of this bit may then be encoded into a binary representation of the bit position.

Because of its parallel nature, this method proves to be faster than the first conventional method provided above. In practice, adjacent bits may be compared in groups larger than pairs of bits using encoders. Implementation of this method may consist of a large cascading structure of static encoders and, for a 64-bit number, can produce the encoded leading bit position with a latency of roughly one computer clock cycle.

Despite the effectiveness of this conventional technique, processing speeds and computer performance could be improved if the time required to produce the location of a leading binary value is decreased. It is desirable, therefore, to provide a faster and more compact means of locating and generating an encoded representation of a leading binary value. The novel technique would advantageously decrease the amount of time required to perform floating point operations in a computer processor.

BRIEF SUMMARY OF THE INVENTION

The problems noted above are solved in large part by a digital circuit configured to locate and output a binary encoded position of a leading or trailing bit of a desired value in an input string of bits. The desired bit value may be a logical one or zero. The summary which follows describes a leading one detector, but can readily be adapted to a leading zero detector or even a trailing one or trailing zero detector. The digital circuit generally comprises a plurality of input encoders, each configured to accept as input equal length sub-strings of the original input string and further configured to generate a binary encoded position of a leading one within the sub-string. The leading one detector circuit also includes a plurality of bit value detectors, each also configured to accept as input the equal length sub-strings of the original input string and also configured to indicate if a one exists within the sub-string. The outputs of the bit value detectors and the binary encoded position from each of the input encoders are transmitted to an encoder arbitrator that forwards the binary encoded position of the leading one located in the most significant sub-string. Lastly, the leading one detector uses a most significant sub-string encoder configured to accept as input the outputs from the bit value detectors and further configured to generate a binary encoded representation of the most significant sub-string containing the desired bit value. The output of the encoder arbitrator and the output of the most significant sub-string encoder are combined or concatenated to form the binary encoded representation of the position of the leading one in the input string of bits. The output from the encoder arbitrator preferably represents the least significant portion and the output from the most significant sub-string encoder represents the most significant portion of the overall output.

The length of the input string is preferably some multiple of two and the length of the binary encoded position is determined from the quotient log(input length)÷log(2). The preferred embodiment described herein receives an input string that is 32 bits long and the length of the binary encoded position is five bits, although the design of leading one detector can be easily altered to accept input strings of different lengths. The sub-strings are preferably eight bits long and the output from the input encoders and the output from the encoder arbitrators are each three bits long. The lengths of the sub-strings may also be altered accordingly.

The encoder arbitrator includes identical sub-arbitrators for each output bit from the input encoders. Thus, in the preferred embodiment, there are three sub-arbitrators, each coupled to a corresponding bit from the input encoders. The encoder sub-arbitrators comprise a dynamic node to forward the bit signals received from each of the input encoders to the output of the sub-arbitrator. Each sub-arbitrator also has a plurality of switches controlled by the outputs from the bit value detectors, each switch capable of coupling the dynamic nodes to ground. If a bit value detector indicates that the desired bit value (in this case a one) exists within the sub-string, the switches controlled by that bit value detector ground the signals on all less significant dynamic nodes.

Generally speaking, the method used in locating and indicating the position of a leading binary bit value in a string of bits includes a variety of steps. First, the input string of bits are divided into shorter length segments, each segment represented by a unique binary value. For each segment, a bit flag is raised for each segment that contain the bit value. The bit flags are used in selecting the unique binary value of the most significant segment that contains the bit value. In a parallel process, encoders generate a binary location of the leading binary bit value for each of the shorter length segments and, using the bit values, the arbitrator selects the binary location for the most significant segment that contains the bit value. Finally, the unique binary value and the binary location selected by the arbitrator are output as a final binary representation of the location of the leading binary bit value in the original string of bits.

In selecting the binary location that is used in the final output, the arbitrator receives the binary locations from the encoders and forwards these binary location signals along dynamic nodes to the output. The arbitrator uses the bit flag signals to ground the dynamic nodes of all less significant segments if the bit flag indicates that a more significant segment contains the bit value.

BRIEF DESCRIPTION OF THE DRAWINGS

For a detailed description of the preferred embodiments of the invention, reference will now be made to the accompanying drawings in which:

FIG. 1 shows a schematic representation of the function of the preferred embodiment;

FIG. 3 shows a truth table for the preferred input byte priority encoder employed in the preferred embodiment;

FIG. 4 shows a truth table for the preferred most significant byte priority encoder employed in the preferred embodiment;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

In addition, the term "leading one," as used in the preferred embodiment, is intended to refer to the most significant non-zero bit in a string of bits. Similarly, "trailing one" is intended to refer to the least significant non-zero bit in a string of bits. It must be noted that the nature of the detection scheme disclosed herein is such that leading or trailing ones or zeroes may be suitably detected with only trivial modifications to the preferred embodiment.

DETAILED DESCRIPTION OF THE PREFERRED EMBODIMENTS

Referring now to FIG. 1, the preferred embodiment comprises a leading one detector 100 configured to accept, as input, a string of bits and determine the location of the leading one in that string of bits. Alternative embodiments designed to identify the position of a leading zero or a trailing one or zero may be created by altering the preferred embodiment as described below. The preferred leading 1 detector 100 outputs the position of the leading one as an encoded binary representation. The input to the leading 1 detector 100 is preferably a bit string with a length of $2^n$, where n is some positive integer. As such, the output of detector 100 is an n-bit representation of the position of the leading one. For instance, in a 64-bit string, n is equal to 6 and a six-bit output is capable of representing the position of a leading one for all 64 slots (0:63) in the input string. In general, the length of the output string may be determined by calculating log(input length)÷log(2). For binary strings of intermediate lengths, the length of the string may be increased to the appropriate $2^n$ value by pre-pending a string of zeros so that the input to the leading 1 detector is filled.

Figure 2:
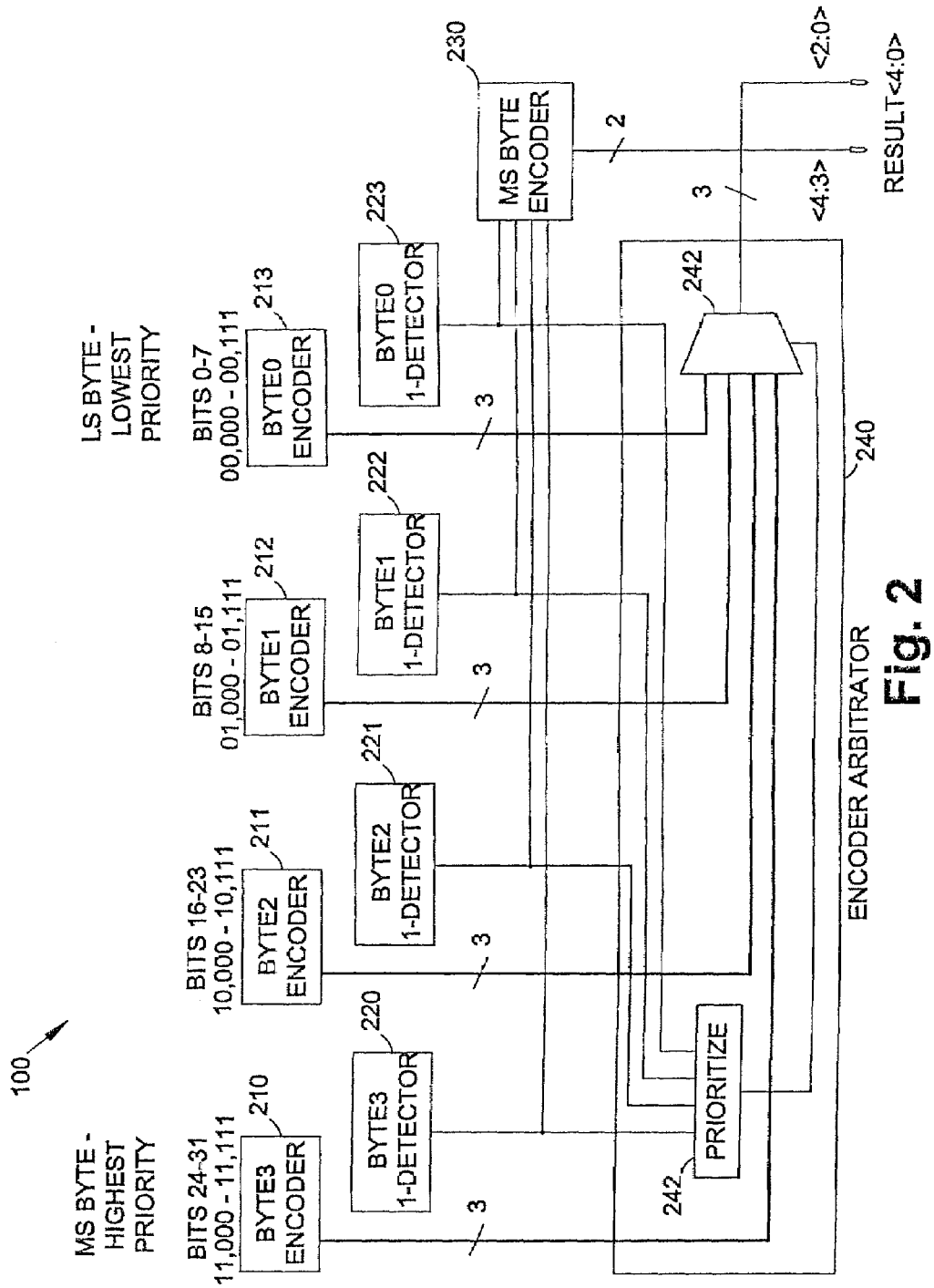
FIG. 2 shows a top level schematic representation of the leading one detection scheme of the preferred embodiment.

The basic building block of the preferred embodiment is a 32-bit leading one detector 100 as shown in FIG. 2. As a first step in the leading 1 detection process, the detector 100 breaks the 32-bit input into equal length sub-strings. Specifically, the preferred embodiment divides the 32-bit input into four separate eight-bit bytes designated BYTE0, BYTE1, BYTE2, and BYTE3. BYTE0 represents the least significant eight bits (0–7) of the 32-bit string and is accordingly assigned the lowest priority. Conversely, BYTE3 represents the most significant eight bits (24–3) and is therefore assigned the highest priority. These priorities are used in determining the final encoded output of the leading 1 detector 100 and are further described below.

In further accordance with the preferred embodiment, each of these four bytes are fed into eight-bit input, three-bit output priority encoders 210, 211, 212, 213. The output of these input byte encoders 210–213 varies depending on the form of the input. For all practical purposes, these input byte encoders 210–213 provide a binary representation of the location of the leading one within each byte. The outputs for the various possible inputs of the input byte encoders 210–213 are shown in the table of FIG. 3. The schematic representation of the input byte encoders 210–213 reflect the 8 input/3 output aspect of the encoders (hence the 8:3 nomenclature). In each of the input entries shown in the table of FIG. 3, an X represents a "do not care" value. That is, for each input byte shown, each bit location marked by an X can take on a value of one or zero and the encoder will still generate the output shown.

As an example, consider the third entry from the top of the table in FIG. 3. This entry has an input of 000001XX and a corresponding output of 101. Based on the above discussion regarding the "do not care" bit X, input bytes 0000 0100, 0000 0101, 0000 0110, and 0000 0111 each will produce the same output (i.e., 101). For each of these input bytes, the leading one appears in the sixth most significant bit (third least significant bit) of the byte. If the bit locations in a byte are numbered 0 through 7 in order of increasing significance, the sixth most significant byte is bit position 2. The three-bit binary representation of the decimal number 2 is 010. The output from the input byte encoder 210 is simply the bit-flipped or active-low version of 010, or 101. The reasoning behind generating an active low output is described below.

Referring still to FIG. 3, one exception to the encoder operation just described is represented by the output for the first entry in the table. The input byte encoder 210–213 output is the same for an input byte with no ones (0000 0000) as it is for a byte with a single one in the least significant bit location (0000 0001). In each case, the output of the input byte encoder 210–213 is 111. While seemingly counterintuitive, the preferred leading one detector 100 has an additional provision for distinguishing between these two input bytes. This provision comes in the form of the input byte 1-Detectors 220, 221, 222, 223 shown in FIG. 2. In addition to the input byte encoders 210–213, each of the four input bytes is also transmitted to respective 1-detectors 220–223, which indicate if any bit within that byte has a non-zero value of 1 (regardless of position). The output of each of the 1-detectors 220–223 are preferably a single bit flag. Thus, the 1-detectors 220–223 essentially perform the function of an eight-input OR gate, although any suitable logic device or logic instructions may be used to perform this function. Hence, the outputs of the input byte encoders 210–213 and the 1-detectors 220–223 are sufficient to distinguish between the 0000 0000 and 0000 0001 input bytes. In the former case, the input byte encoder 210–213 and 1-detector 220–223 outputs are 111 and 0, respectively while in the latter case, the outputs are 111 and 1, respectively.

Referring again to FIG. 2, the outputs from the four 1-detectors 220–223 are used for a variety of purposes. One function of the 1-detectors 220–223 is to prioritize the outputs from the input byte encoders 210–213. Another function is to aid in the determination of which of the four input bytes contains the most significant leading one. The leading one detector 100 preferably operates by breaking down the encoded, 5-bit leading one position into two parts. The upper portion (RESULT<4:3>) is comprised of two bits and the lower portion (RESULT<2:0>) is comprised of three bits. Each portion is determined independent of the other, which permits parallel processing thereby decreasing the time required to generate the leading one location. The results of each process are concatenated to form a single representation of the leading one location in the entire 32-bit string. The upper two bits of the result are generated by a "Most Significant (MS) Byte" encoder 230, which is preferably a priority encoder that receives the output from each of the four 1-detectors 220–223. The MS Byte encoder 230, as the name implies, merely selects the most significant byte (of the four input bytes) that has at least one "one" bit. More specifically, the MS Byte encoder 230 transmits a two-bit binary representation of the most significant byte containing a one to the output.

Inspection of the binary representations of the bit positions in the four input bytes reveals that for each byte, the first two bits of the bit locations within that byte are unique to that byte and remain the same over the entire byte. For instance, if a leading one appears in BYTE2, then this leading one must be located somewhere in the range of bits numbered 16 through 23. The binary representation of this range is 10000 through 10111. Similarly, for a leading one appearing in BYTE1, the range of bit locations is 8 through 15, which may be represented as 01000 through 01111. In each case, the first two bits are fixed (0 and 01, respectively). The same holds true for bit positions in BYTE3 (11) and BYTE0 (00). Thus, the function of the MS Byte encoder 230 is to determine the most significant byte that contains at least one "one" and forward the first two bits corresponding to the bit locations in that byte to the output as RESULT<4:3>. The MS Byte encoder 230 may perform this function using a process similar to the input byte encoders 210–213. FIG. 4 offers a table of MS Byte encoder outputs corresponding to various inputs.

Referring now to FIG. 4, similar to the 8:3 encoder used for the input byte encoders 210–213, the MS Byte encoder 230 is preferably a 4:2 encoder, which implies that there are four inputs and two outputs. As mentioned above, the four inputs are received from each of the 1-detectors 220–223. The output is preferably a two-bit representation of the most significant byte containing a one. Using the same notation as in FIG. 3, the X bits in the table of FIG. 4 represent a "do not care" bit. In short, the output of the MS Byte encoder 230 reflects the most significant bit location (0 through 3) holding a one. Consequently, a 1 from the output of the BYTE3 1-detector 220 will yield an output of 11 regardless of whether there are any "ones" in the BYTE2 221, BYTE1 222, or BYTE0 223 1-detectors. The remainder of the input scenarios are as shown in the table of FIG. 4. In general, the lower priority 1-detectors 221–223 will only trigger the respective outputs 10, 01, or 00 if the outputs of higher priority 1-detectors 220–222 do not contain a one.

Referring again to FIG. 2, the lower three bits of the output (RESULT<2:0>) are generated by an encoder arbitrator 240. The encoder arbitrator uses the outputs from the 1-detectors 220–223 to determine which of the four input byte encoder 210–213 outputs to forward to the output of the leading one detector 100. The encoder arbitrator 240 operates much like a multiplexer 242 in selecting the outputs from one of the input byte encoders 210–213 to forward to the output of the arbitrator 240. The selection signal that controls the "multiplexer" function derives from prioritization logic 244 that looks to the outputs of 1-detectors 220–223 and uses the highest priority output to control the output of the arbitrator 240. Simply stated, the encoder arbitrator 240 determines the most significant input byte containing a one and forwards the output from the input byte encoder 210–213 for that byte to the output as RESULT<2: 0>. Thus, having already determined the value of RESULT<4:3> from the MS Byte encoder 230, the entire leading one detector output is available as the 5-bit output, RESULT<4:0>.

The preferred embodiment of the encoder arbitrator does not actually implement a multiplexer 242 shown in FIG. 2, although this is certainly a feasible embodiment. Multiplexer 242 is shown in FIG. 2 to conceptualize the function of encoder arbitrator 240. Instead, the preferred encoder 240 uses a series of MOS switches and combinatorial logic to increase speed. The preferred embodiment of the encoder arbitrator 240 is shown in FIG. 5.

Figure 5:
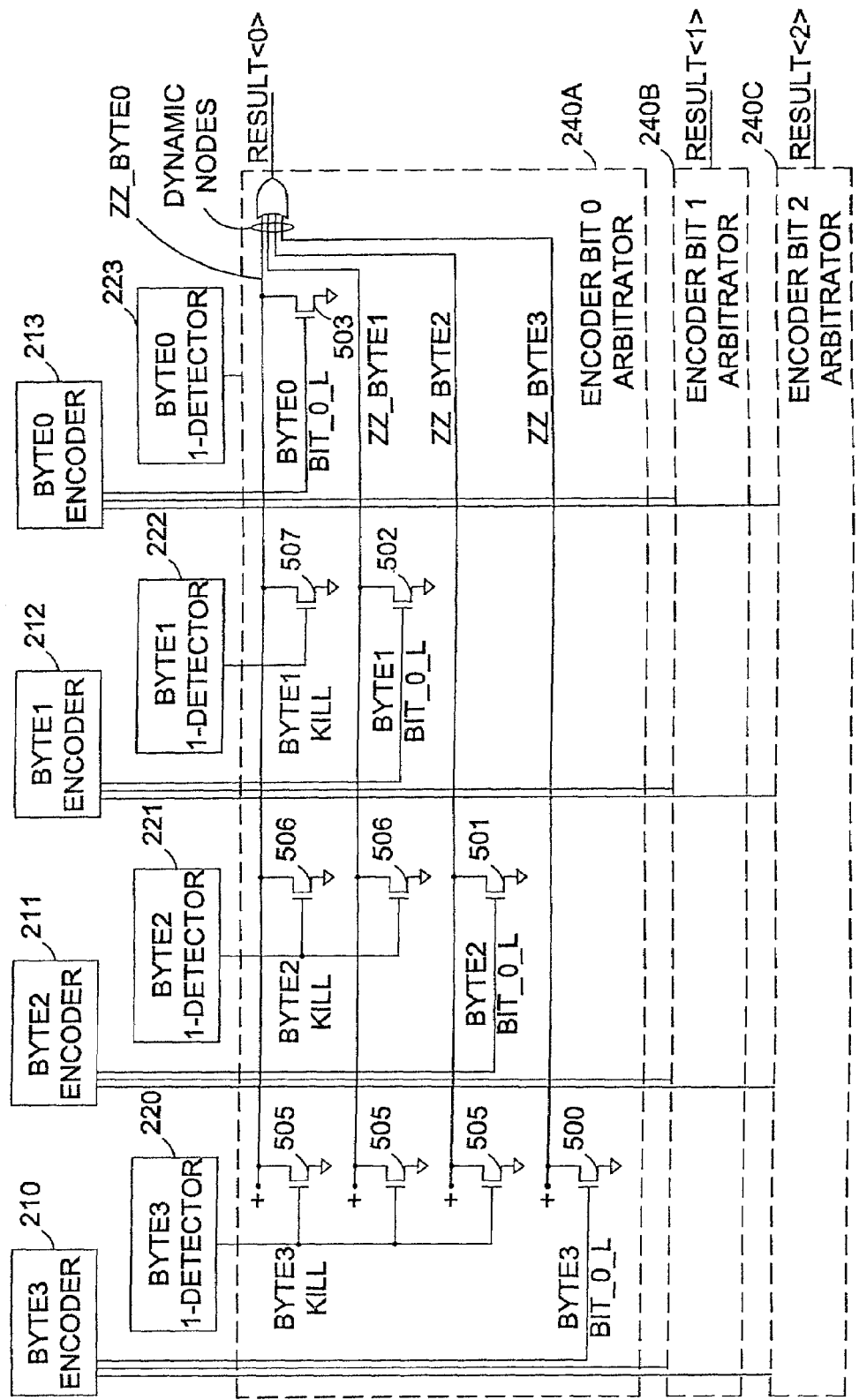
FIG. 5 shows a schematic representation of the bit level encoder arbitrator employed in the preferred embodiment.

Referring now to FIG. 5, the preferred embodiment of the encoder arbitrator 240 is shown. The encoder arbitrator 240 preferably consists of three separate sub-arbitrators 240A, 240B, 240C, each corresponding to one of the three-bit output from the input byte encoders 210–213. Each of the sub-arbitrators 240A–240C preferably receives the same bit from each input byte encoder 210–213. For example, sub-arbitrator 240A may be configured to receive bit 0 from the input byte encoders 210–213 and may therefore be called the Bit 0 Arbitrator. By analogy, sub-arbitrators 240B and 240C may be called the Bit 1 and Bit 2 Arbitrators respectively. All three sub-arbitrators 240A–240C also receive the outputs from the four 1-detectors 220–223. For clarity, only the contents of the Bit 0 Arbitrator 240A are shown. The logic structure of each of the sub-arbitrators 240A–240C are preferably the same.

According to the preferred embodiment, Bit 0 from each input byte encoder 210–213 is coupled to the gate of a MOS inverter 500–503. As indicated above, the signals coming from the input byte encoders 210–213 are active low signals, hence the _L designation on each of the Bit 0 signals (e.g., BYTE3_BIT_0_L). The source of each MOS inverter 500–503 is preferably coupled to ground while the drain of each MOS inverter 500–503 is coupled to a dynamic node corresponding to each input byte. For instance, the gate of MOS inverter 500 is coupled to the BYTE3_BIT_0_L signal and the drain of that same inverter 500 is coupled to dynamic node signal ZZ_BYTE3. Dynamic node signals ZZ_BYTE2, ZZ_BYTE1, and ZZ_BYTE0 are shown for input bytes 2, 1 and 0 as well. Each of the four dynamic node signals are transmitted to a logical OR gate 510 that generates a logic one at the output of the sub-arbitrator 240A if a logic one appears on any of the four dynamic node signals.

The dynamic nodes generally transmit the logical inverse of the bit signals transmitted from the input byte encoders 210–213 to the arbitrators 240A–240C. By way of example, if the BYTE3_BIT_0_L signal is low (active low, logic one) the gate and drain of MOS inverter 500 are separated by a high impedance, and consequently, an active high, logic one (from the positive+voltage source) is transmitted along dynamic node signal ZZ_BYTE3 or the OR gate 510. It must be noted however, that the signals on the dynamic nodes are subject to being grounded (forced to a logical zero) if a higher priority byte contains a logical one. Since BYTE3 is the highest priority input byte, dynamic node signal ZZ_BYTE3 is preferably always transmitted to OR gate 510. Conversely, since BYTE0 is the lowest priority input byte, dynamic node signal ZZ_BYTE0 is forced to zero if BYTE1, BYTE2, or BYTE3 contain a one.

This priority grounding functionality is preferably embodied by coupling dynamic nodes ZZ_BYTE2, ZZ_BYTE1, and ZZ_BYTE0 to grounding switches 505, 506, 507 that are capable of grounding (forcing to logic zero) the dynamic node signals. The position of grounding switches 505–507 are preferably controlled by kill signals, which are simply the outputs from higher priority byte 1-detectors 220, 221, 222. In FIG. 5, the outputs from 1-detectors 220, 221, 222 are labeled BYTE3 KILL, BYTE2 KILL, and BYTE1 KILL, respectively, to accurately reflect the function of these signals in sub-arbitrator 240A. These KILL signals are transmitted to the gates of grounding switches 505–507. Specifically, the output from BYTE3 1-detector 220 is transmitted to the gate of grounding switches 505 as a BYTE3 KILL signal capable of grounding dynamic nodes ZZ_BYTE2, ZZ_BYTE1, and ZZ_BYTE0. Similarly, the output from BYTE2 1-detector 221 is transmitted to the gate of grounding switches 506 as a BYTE2 KILL signal capable of grounding dynamic nodes ZZ_BYTE1, and ZZ_BYTE0. Lastly, the output from BYTE1 1-detector 222 is transmitted to the gate of grounding switch 507 as a BYTE1 KILL signal capable of grounding dynamic node ZZ_BYTE0. For each input byte, if the KILL signal leading to the gate of a grounding switch is logically high (indicating a one exists within that byte), then all lower priority dynamic nodes are pulled (connected) to ground. Otherwise, if a KILL signal is low (logic zero), the lower priority dynamic node signals are left intact. With this logic circuit repeated for the other two sub-arbitrators 240B, 240C, the preferred embodiment guarantees that only the bit location of a leading one in the highest priority input byte is transmitted to the output of arbitrators 240.

It should be noted that whereas the grounding switches 505–507 are preferably embodied using MOS inverter switches, alternative devices such as multiplexers, tri-state buffers, or other transistor switches may be used as well. Similarly, OR device 510 may be implemented using other logic devices, including other diode or transistor logic gates such as a NOR gate.

Figure 6:
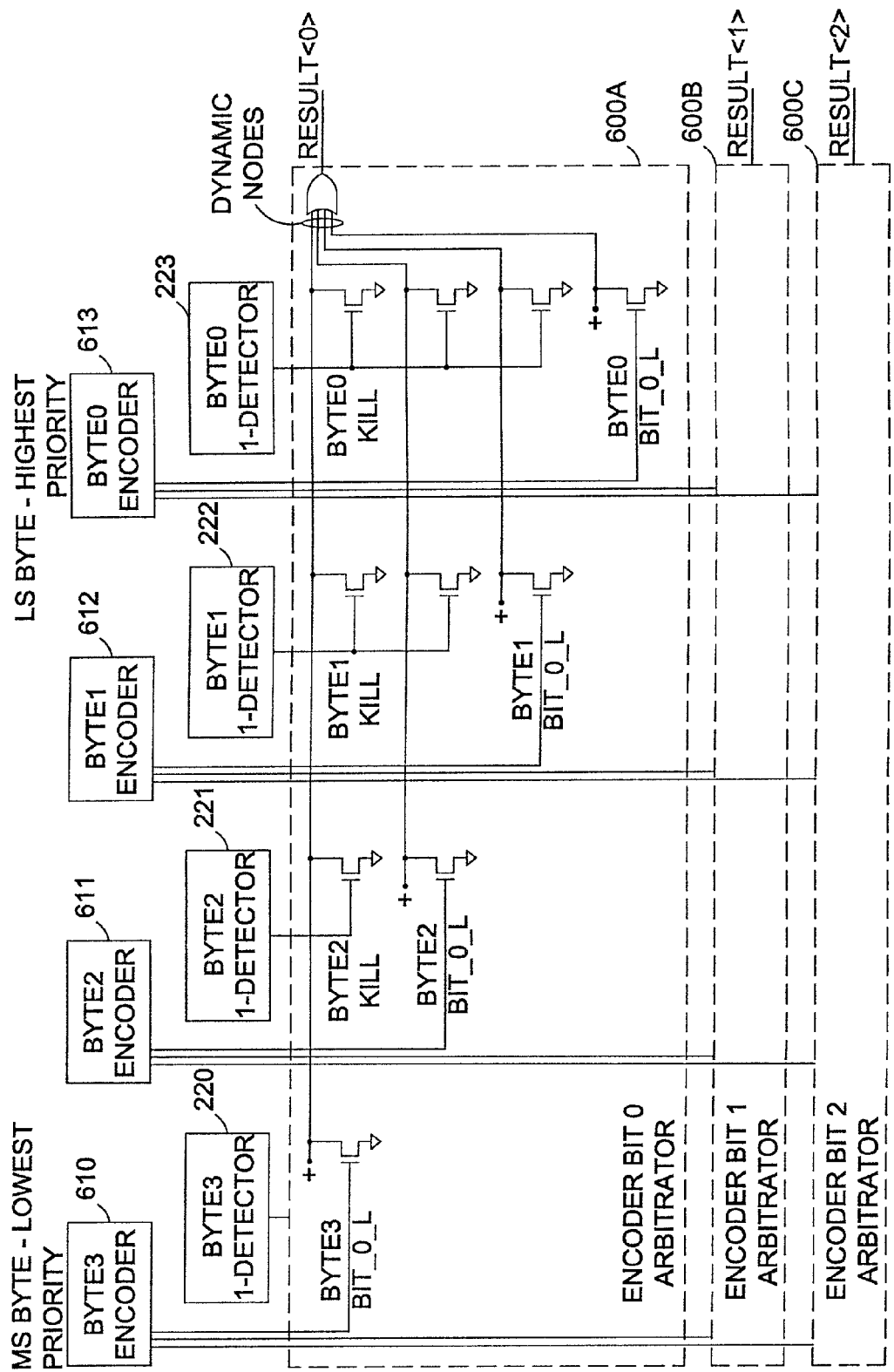
FIG. 6 shows a schematic representation of the bit level encoder arbitrator employed in an alternative embodiment for detecting a trailing 1.

Referring now to FIG. 6, an alternative embodiment of encoder arbitrator 600 configured to detect a trailing one is shown. As with arbitrator 240, this alternative embodiment consists of three sub-arbitrators 600A, 600B, 600C. Each of the three sub-arbitrators 600A–600C preferably comprises the same logic circuit, although in FIG. 6, the preferred logic circuitry for the alternative embodiment is shown only in sub-arbitrator 600A for clarity. Inputs to each sub-arbitrator 600A–600C are the same as in the preferred embodiment shown in FIG. 5 (i.e., from input byte encoders 610–613 and 1-detectors 220–223). However, in this alternative embodiment, the prioritization scheme is reversed such that BYTE0 (the least significant byte) is given the highest priority and BYTE3 (the most significant byte) is given the lowest priority. As such, the output signal from BYTE0 1-detector 223 acts as a KILL signal capable of pulling the dynamic nodes for BYTE1, BYTE2, and BYTE3 to zero or ground. This is in contrast with the preferred embodiment shown in FIG. 5, where there is no BYTE0 KILL signal. By the same token, the alternative embodiment in FIG. 6 does not have a BYTE3 KILL signal, reflecting the lack of any priority for the most significant byte BYTE3. By reversing the priorities of the input bytes in this manner, this alternative embodiment successfully transmits the position of the least significant bit location provided by the input byte encoders 210–213.

Figure 8:
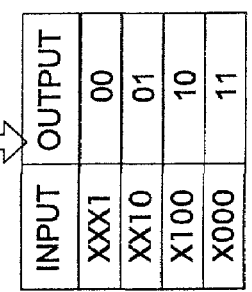
FIG. 8 shows a truth table for an alternative most significant byte priority encoder employed in the trailing one detection scheme.
Figure 7:
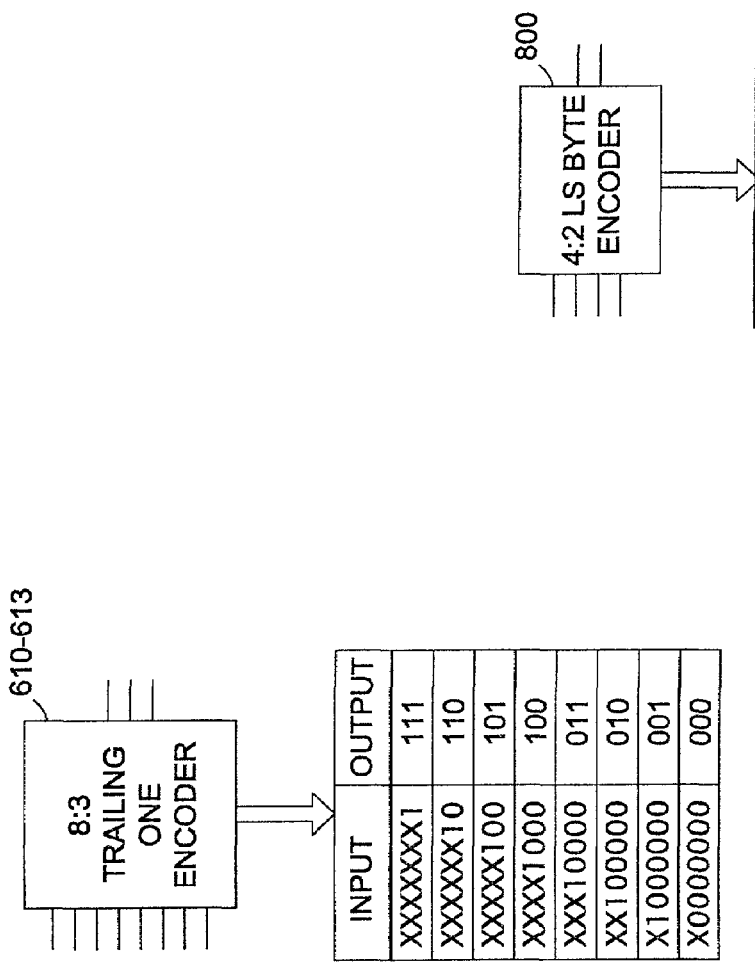
FIG. 7 shows a truth table for an alternative byte level priority encoder employed in a trailing one detection scheme.

In addition to the modifications in the alternative encoder arbitrator shown in FIG. 6, the input byte encoder 610–613 outputs must also be slightly altered to indicate the position of a trailing one. Similarly, the output from the most significant byte encoder (not specifically shown in FIG. 6, but which operates as shown in FIG. 2) must be changed as well. These encoding schemes are shown in FIGS. 7 and 8, which exhibit a representative 8:3 trailing one encoder 610–613 and an alternative most significant byte encoder, which in this embodiment may be referred to as a least significant byte encoder 800. The change in nomenclature reflects the fact that the alternative embodiment is searching for the least significant one instead of the most significant one. The outputs of these alternative encoders are analogous to the outputs of the preferred encoders 210–213, 230 shown in FIGS. 3 and 4 with the obvious exception that the alternative encoders 610–613, 800 indicate trailing one positions. That is, the outputs provide a binary representation of the position of the least significant one in the input. As with the leading one encoders 610–613, 230, the alternative encoders 610–613, 800 shown in FIGS. 7 and 8 ignore positions other than the position of interest. Thus, the alternative encoders 610–613, 800 search for a trailing one and ignore all other more significant bits, which are represented by the character X. Furthermore, the outputs of alternative encoders 610–613, 800 are active low similar to the preferred encoders 610–613, 230. As shown, the encoders 610–613, 800 of FIGS. 7 and 8 and the encoder arbitrator 600 of FIG. 6 are sufficient to build a trailing one detector that operates similar to the preferred leading one detector.

Figure 9:
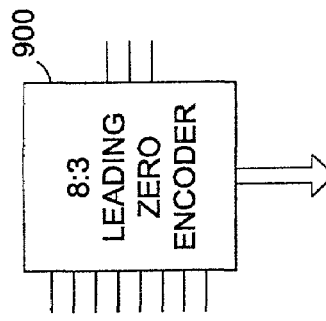
FIG. 9 shows a truth table for an alternative input byte priority encoder employed in a leading zero detection scheme.

The teachings herein may also be extended to create a leading zero detector. To successfully create a leading zero detector, the 1-detectors of the preferred embodiment naturally become 0-detectors, which simply implies that instead of generating a one if a one is detected in an input byte, the 0-detector generates a one if a zero is detected in an input byte. In addition to the 0-detectors, the preferred encoder arbitrator 240 and MS byte encoder 230 are used in conjunction with the input byte encoder 900 shown in FIG. 9. This particular encoder outputs the position of the most significant zero in the input byte. The table shown in FIG. 9 is nearly identical to the table shown in FIG. 3 with the exception that all input ones and zeros are flipped because the encoder must detect a leading zero instead of a leading one. All "do not care" X bits remain the same. Given this knowledge, an alternative trailing zero encoder may also be created from the trailing one encoders shown in FIGS. 7 and 8 by similarly flipping the input one and zero bits. Thus, the position of leading or trailing ones or zeroes may be located in a 32-bit input string using the appropriate combination of input encoders and encoder arbitrators as disclosed herein.

It should be noted that the preferred and alternative embodiments discussed above presume the existence of at least one bit of the appropriate type. That is, the leading or trailing one detectors assume that at least one "one" exists in the input string. Similarly, the leading or trailing zero detectors assume that at least one "zero" exists in the input string. If the appropriate type of bit does not exist, the preferred leading "bit" detector will indicate that the appropriate bit exists in the least significant bit location. Similarly, the preferred trailing "bit" detector will indicate that the appropriate bit exists in the most significant bit location. As an example, if the leading one detector receives a string of zeroes, the detector will output a value of 00000. Likewise, if the trailing zero detector receives a string of ones, the detector will output a value of 11111. However, it is a trivial task to monitor the value of the trailing bit in a leading-one or leading-zero detector to generate a VALID bit (not shown) to indicate whether the preferred and alternative detectors are generating a valid bit position. For example, in a leading-one detector, the value of the trailing bit may be used as the VALID bit such that when a one resides in the least significant bit location, the detector output can be regarded as valid. Conversely, if the trailing bit in a leading-one detector is zero, the output of the detector may be regarded as invalid. In this same manner, the leading bit in a trailing-one or trailing-zero detector may be monitored to determine if the detector output is valid. Such a provision may not be necessary or of insignificant consequence, but the preferred embodiment may be altered to account for these conditions.

Figure 10:
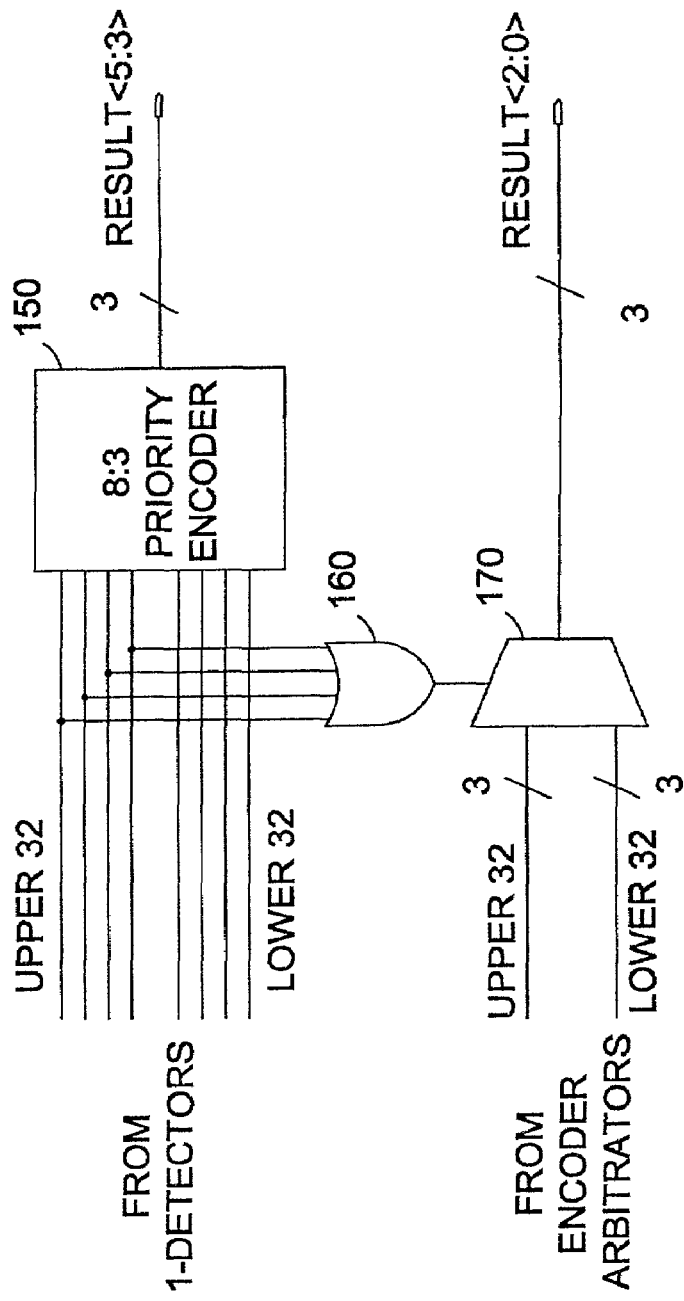
FIG. 10 is a schematic representation showing how the preferred leading one detection scheme may be expanded for use with larger bit string inputs.

Referring now to FIG. 10, the preferred 32-bit leading one detector 100 may be used to create a 64-bit leading one detector as shown. The 64-bit detector uses two, slightly modified 32-bit leading one detectors, one each for the upper and lower 32-bits of the input string. The only required modification to the basic 32-bit leading one detector 100 is that a single 8:3 MS Byte encoder 150 replaces the MS Byte encoders 230 for each of the 32-bit leading one detectors. With a 64-bit input, the output from the leading one detector must be at least 6-bits in length to fully represent all 64 possible positions of a leading one. The upper three bits represent the most significant byte of the eight input bytes that contains a one. The 8:3 MS Byte encoder 150 shown in FIG. 10 generates this byte location as a three bit output, which represents the upper three bits of the overall result (RESULT<5:3>). As with the MS Byte encoder 230 shown in FIG. 2, the 8:3 MS Byte encoder of FIG. 10 receives the outputs from each of the 1-detectors. In this particular embodiment, there are eight 1-detectors, which results in eight inputs to the 8:3 MS Byte encoder 150. The output of the 8:3 MS Byte encoder 150 is virtually identical to the 8:3 input byte encoder 610–613 shown in FIG. 3 with the notable exception that the output bits are not active low. In other words, the output of the 8:3 MS Byte encoder 150 are the bit-flipped version of the outputs shown in FIG. 3.

The lower three bits of the 64-bit leading one detector output (RESULT<2:0>) may be determined from the encoder arbitrators of the upper and lower 32-bit decoders. In general, the output from either the upper or the lower 32 bit encoder arbitrator is selected to become part of the final output. This selection between the upper or lower arbitrator output is based on outputs from the 1-detectors. Since both encoder arbitrators output a valid leading one location for the upper and lower 32 bits of the 64-bit input, the selection must necessarily be based on whether there are any ones located in the upper 32 bits of the input. If there are any ones in the upper 32 bits of the input, then the output from the upper encoder arbitrator is selected to be the output bits RESULT<2:0>. Conversely, if there are not any ones in the upper 32 bits of the input, then the output from the lower encoder arbitrator is selected to be the output bits RESULT<2:0>.

The logic devices shown in FIG. 10 are capable of performing the decisions just described. OR gate 160 serves to control the position of multiplexer bank 170 based on whether there is a one at any of the four OR gate inputs. If the OR gate 160 receives a one at any of the four inputs, this means that a leading one exists in the upper 32 bits of the input and the multiplexer bank 170 switches to select the output from the encoder arbitrator for the upper 32 bits. However, if there are no ones in the upper 32 bits, then the output of OR gate 160 changes and the multiplexer bank 170 switches to select the output from the encoder arbitrator for the lower 32 bits. An alternative approach to OR gate 160 is to simply use the value of RESULT<5> as the control signal for multiplexer 170 (as shown by trace 180). This approach yields the same result because RESULT<5> will only be high if there is a logic one in the leading-i detectors from the upper 32-bit detector.

The logic circuit shown in FIG. 10 is merely representative of the logical decisions and selections that are needed to convert the preferred 32-bit leading one detector into a 64-bit leading one detector. Nothing within this description is intended to limit the scope of this application to the specific logic devices shown. Other embodiments are certainly feasible and other logic devices may be used to select the output of the appropriate 32-bit components. For instance, preferred 32-bit detector 100 of FIG. 2 may be implemented as is for the upper and lower 32 bits of a 64-bit input. In such a case, the 5-bit encoded outputs of each detector reveals the position of the leading one in the upper and lower 32-bits. These values may then be checked to see which of the two 5-bit outputs should be used as part of the final output. If the output of the upper 32-bit detector is used, the 5-bit detector output is appended to a 1 (1XXXXX). Conversely, if the output of the lower 32-bit detector is used, the final output is in the form 0XXXXX. Other embodiments of multiplexer bank 170 may include using a series of transistor or diode switches and the OR gate 160 may be implemented using other logic gates and the inputs to the gate may be transmitted from the lower four 1-detectors or perhaps all the 1-detectors. In addition, the teachings herein may be extended to leading one detection in 128-bit, 256-bit, or other length input strings. Furthermore, some advantage may be gained by using an input string of 64 or more bits so as to reduce the combined quantities of switching logic found in the encoder arbitrators. Such alternatives are certainly understood to be within the scope of those skilled in the art.

The above discussion is meant to be illustrative of the principles and various embodiments of the present invention. Numerous variations and modifications will become apparent to those skilled in the art once the above disclosure is fully appreciated. For example, it must be noted that while the various figures are shown in schematic form, the preferred embodiment may be implemented using hardware (using logic devices) or in software code. It is intended that the following claims be interpreted to embrace all such variations and modifications.

What is claimed is:

1. A digital circuit configured to locate and output a binary encoded position of a leading bit of a desired value in an input string of bits, comprising:
   a plurality of input encoders, each accepting as input equal length sub-strings of the original input string, and each generating a binary encoded position of a leading bit of a desired value within the sub-string;
   a plurality of bit value detectors, each also accepting as input the equal length sub-strings of the original input string, each detector indicating if the desired bit value exists within the sub-string;
   an encoder arbitrator accepting as input the outputs of the bit value detectors and the binary encoded position from each of the input encoders, said arbitrator forwarding the binary encoded position of the leading bit of a desired value within the most significant sub-string; and
   a most significant sub-string encoder that accepts as input the outputs from the bit value detectors, said sub-string encoder generating a binary encoded representation of the most significant sub-string comprising the desired bit value;
   wherein the output of the encoder arbitrator and the output of the most significant sub-string encoder are concatenated to form the binary encoded representation of the position of the leading bit of a desired value in the input string of bits.

2. The digital circuit of claim 1 wherein the length of the input string is some multiple of two and the length of the binary encoded position is determined from the quotient log(input length)÷log(2).

3. The digital circuit of claim 2 wherein the length of the input string is 32 and the length of the binary encoded position is five.

4. The digital circuit of claim 3 wherein the sub-strings are eight bits long and the output from the input encoders and the output from the encoder arbitrators are each three bits long.

5. The digital circuit of claim 1 wherein:
   the output of the encoder arbitrator represents the least significant portion and
   the output of the most significant sub-string encoder represents the most significant portion of the binary encoded representation of the position of the leading bit of a desired value in the input string of bits.

6. The digital circuit of claim 5 wherein the encoder arbitrator further comprises identical sub-arbitrators for each output bit from the input encoders.

7. The digital circuit of claim 6 wherein the encoder sub-arbitrators further comprise:
   a dynamic node to forward the bit signals received from each of the input encoders to the output of the sub-arbitrator; and
   a plurality of switches controlled by the outputs from the bit value detectors, each switch capable of coupling the dynamic nodes to ground;
   wherein if a bit value detector indicates that the desired bit value exists within the sub-string, the switches controlled by that bit value detector ground the signals on all less significant dynamic nodes.

8. A digital circuit configured to locate and output a binary encoded position of a trailing bit of a desired value in an Input string of bits, comprising:
   a plurality of input encoders, each accepting as input equal length sub-strings of the original input string, and each generating a binary encoded position of a trailing bit of a desired value within the sub-string;
   a plurality of bit value detectors, each also accepting as input the equal length sub-strings of the original input string, each detector indicating if the desired bit value exists within the sub-string;
   an encoder arbitrator accepting as input the outputs of the bit value detectors and the binary encoded position from each of the input encoders, said arbitrator forwarding the binary encoded position of the trailing bit of a desired value within the least significant sub-string; and
   a least significant sub-string encoder accepting as input the outputs from the bit value detectors, said sub-string encoder generating a binary encoded representation of the least significant sub-string comprising the desired bit value;
   wherein the output of the encoder arbitrator and the output of the least significant sub-string encoder are concatenated to form the binary encoded representation of the position of the trailing bit of a desired value in the input string of bits.

9. The digital circuit of claim 8 wherein the length of the input string is some multiple of two and the length of the binary encoded position is determined from the quotient log(input length)÷log(2).

10. The digital circuit of claim 9 wherein the length of the input string is 32 and the length of the binary encoded position is five.

11. The digital circuit of claim 10 wherein the sub-strings are eight bits long and the output from the input encoders and the output from the encoder arbitrators are each three bits long.

12. The digital circuit of claim 8 wherein:
the output of the encoder arbitrator represents the least significant portion and
the output of the least significant sub-string encoder represents the most significant portion of the binary encoded representation of the position of the trailing bit of a desired value in the input string of bits.

13. The digital circuit of claim 12 wherein the encoder arbitrator further comprises identical sub-arbitrators for each output bit from the input encoders.

14. The digital circuit of claim 13 wherein the encoder sub-arbitrators further comprise:
a dynamic node to forward the bit signals received from each of the input encoders to the output of the sub-arbitrator; and
a plurality of switches controlled by the outputs from the bit value detectors, each switch capable of coupling the dynamic nodes to ground;
wherein if a bit value detector indicates that the desired bit value exists within the sub-string, the switches controlled by that bit value detector ground the signals on all more significant dynamic nodes.

15. A method of locating and indicating the position of a leading binary bit value in a string of bits, comprising:
a) dividing the string of bits into shorter length segments, each segment represented by a unique binary value;
b) setting a bit flag for each of the shorter length segments that contain the bit value;
c) generating a binary location of the leading binary bit value for each of the shorter length segments;
d) selecting the unique binary value of the most significant shorter length segment that contains the bit value:
e) selecting the binary location generated in step c) for the most significant shorter length segment that contains the bit value; and
f) concatenating the unique binary value selected in step d) with the binary location selected in step e) to output a final binary representation of the location of the leading binary bit value in the original string of bits.

16. The method of claim 15, wherein selecting the binary location that is used in the final output further comprises:
receiving the binary locations from step C) and forwarding these binary location signals along dynamic nodes to the output;
using the bit flag signals to ground the dynamic nodes of all less significant segments if the bit flag indicates that a more significant segment contains the bit value.

17. The method of claim 16, wherein the shorter length segments are equal in length.

18. The method of claim 17, wherein the selection of the unique binary value in step d) and the selection of the binary location in step e) are executed in parallel.

19. The method of claim 18, wherein the unique binary value selected in step d) is the most significant portion of the final binary representation of the location of the leading binary bit value in the original string of bits.

20. A method of locating and indicating the position of a trailing binary bit value in a string of bits, comprising:
a) dividing the string of bits into shorter length segments, each segment represented by a unique binary value;
b) setting a bit flag for each of the shorter length segments that contain the bit value;
c) generating a binary location of the trailing binary bit value for each of the shorter length segments;
d) selecting the unique binary value of the least significant shorter length segment that contains the bit value;
a) selecting the binary location generated in step c) for the least significant shorter length segment that contains the bit value; and
f) concatenating the unique binary value selected in step d) with the binary location selected in step e) to output a final binary representation of the location of the trailing binary bit value in the original string of bits.

21. The method of claim 20, wherein selecting the binary location that is used in the final output further comprises:
receiving the binary locations from step c) and forwarding these binary location signals along dynamic nodes to the output;
using the bit flag signals to ground the dynamic nodes of all more significant segments if the bit flag indicates that a less significant segment contains the bit value.

22. The method of claim 21, wherein the shorter length segments are equal in length.

23. The method of claim 22, wherein the selection of the unique binary value in step d) and the selection of the binary location in step e) are executed in parallel.

24. The method of claim 23, wherein the unique binary value selected in step d) is the most significant portion of the final binary representation of the location of the trailing binary bit value in the original string of bits.

25. A method of locating and indicating the position of a leading binary bit value in an input string of bits, comprising:
sub-dividing the input string into substrings:
locating the position of the leading binary bit value in each substring and generating a first binary representation of this position for each substring;
identifying a most significant substring that includes the most significant bit value in the input string and generating a second binary representation of this substring; and
combining the first binary representation corresponding to the most significant substring and the second binary representation to form a single output binary representation of the position of a leading binary bit value in the input string.

26. The method of claim 25, wherein the substrings are equal length substrings.

27. The method of claim 26, further comprising:
assigning a bit flag to each substring; and
setting the bit flag if the substring includes the binary bit value.

28. The method of claim 27, further comprising:
using the bit flag to identify the substring that includes the most significant bit value in the input string; and
using the bit flag to select which of the first binary representations to combine with the second binary representation for the single output binary representation.

29. A method of locating and indicating the position of a trailing binary bit value in an input string of bits, comprising:
sub-dividing the input string into substrings;
locating the position of the trailing binary bit value in each substring and generating a first binary representation of this position for each substring;
identifying a least significant substring that includes the least significant bit value in the input string and generating a second binary representation of this substring; and combining the first binary representation corresponding to the least significant substring and the second binary representation to form a single output binary representation of the position of a trailing binary bit value in the input string.

30. The method of claim 29, wherein the substrings are equal length substrings.

31. The method of claim 30, further comprising:
assigning a bit flag to each substring; and
setting the bit flag if the substring includes the binary bit value.

32. The method of claim 31, further comprising:
using the bit flag to identify the substring that includes the least significant bit value in the input string; and
using the bit flag to select which of the first binary representations to combine with the second binary representation for the single output binary representation.

33. A digital circuit for generating a binary encoded position of a leading bit value in an input string of bits, comprising:
a sub-dividing means for dividing the input string of bits into equal length sub-strings;
an input encoder means corresponding to each sub-string for generating a binary encoded position of a leading bit value in each sub-string;
a bit value detection means corresponding to each sub-string to indicate whether the bit value exists in each sub-string;
an output encoder means for selecting the most significant sub-string containing the bit value and generating a unique binary representation of this sub-string; and
an arbitrator means for selecting the most significant sub-string containing the bit value and forwarding the binary encoded position from the input encoder means corresponding to that sub-string;
wherein the output of the output encoder means and the output of the arbitrator means are combined to form a single binary representation of the position of the leading bit value in the input string of bits.

34. The digital circuit of claim 33 wherein:
the output of the arbitrator means represents the least significant portion and
the output of the output encoder means represents the most significant portion of the single binary representation of the position of the leading bit value in the input string of bits.

35. The digital circuit of claim 33 wherein the bit value detection means indicates whether the bit value exists in each sub-string by setting a bit corresponding to that sub-string.

36. The digital circuit of claim 33 wherein:
the output encoder means and the arbitrator means use the output from the bit value detection means to select the most significant sub-string containing the bit value.

37. The digital circuit of claim 36 wherein the arbitrator means further comprises identical sub-arbitrator means for each output bit from the input encoder means.

38. The digital circuit of claim 37 wherein the encoder sub-arbitrator means further comprise:
a dynamic node means to forward the bit signals received from each of the input encoder means to the output of the sub-arbitrator means; and
a plurality of switch means controlled by the outputs from the bit value detection means, each switch means capable of coupling the dynamic node means to ground;
wherein if any bit value detection means indicates that the bit value exists within that sub-string, the switch means controlled by that bit value detection means ground the signals on all less significant dynamic node means.

39. A digital circuit for generating a binary encoded position of a trailing bit value in an input string of bits, comprising:
a sub-dividing means for dividing the input string of bits into equal length sub-strings;
an input encoder means corresponding to each sub-string for generating a binary encoded position of a trailing bit value in each sub-string;
a bit value detection means corresponding to each sub-string to indicate whether the bit value exists in each sub-string;
an output encoder means for selecting the least significant sub-string containing the bit value and generating a unique binary representation of this sub-string; and
an arbitrator means for selecting the least significant sub-string containing the bit value and forwarding the binary encoded position from the input encoder means corresponding to that sub-string;
wherein the output of the output encoder means and the output of the arbitrator means are combined to form a single binary representation of the position of the trailing bit value in the input string of bits.

40. The digital circuit of claim 39 wherein:
the output of the arbitrator means represents the least significant portion and
the output of the output encoder means represents the most significant portion of the single binary representation of the position of the trailing bit value in the input string of bits.

41. The digital circuit of claim 39 wherein the bit value detection means indicates whether the bit value exists in each sub-string by setting a bit corresponding to that sub-string.

42. The digital circuit of claim 39 wherein:
the output encoder means and the arbitrator means use the output from the bit value detection means to select the least significant sub-string containing the bit value.

43. The digital circuit of claim 42 wherein the arbitrator means further comprises identical sub-arbitrator means for each output bit from the input encoder means.

44. The digital circuit of claim 43 wherein the encoder sub-arbitrator means further comprise:
a dynamic node means to forward the bit signals received from each of the input encoder means to the output of the sub-arbitrator means; and
a plurality of switch means controlled by the outputs from the bit value detection means, each switch means capable of coupling the dynamic node means to ground;
wherein if any bit value detection means indicates that the bit value exists within that sub-string, the switch means controlled by that bit value detection means ground the signals on all more significant dynamic node means.

* * * * *

UNITED STATES PATENT AND TRADEMARK OFFICE
CERTIFICATE OF CORRECTION

PATENT NO. : 7,012,965 B2
APPLICATION NO. : 10/036117
DATED : March 14, 2006
INVENTOR(S) : Shi-Huang Yin et al.

It is certified that error appears in the above-identified patent and that said Letters Patent is hereby corrected as shown below:

In column 5, line 1, delete "(24-3)" and insert -- (24-31) --, therefor.

In column 6, line 28, delete "(0 and 01," and insert -- (10 and 01, --, therefor.

In column 11, line 2, delete "leading-i" and insert -- leading-1 --, therefor.

In column 12, line 39, in Claim 8, delete "Input" and insert -- input --, therefor.

In column 13, line 38, in Claim 15, delete "value:" and insert -- value; --, therefor.

In column 13, line 47, in Claim 16, delete "C)" and insert -- c) --, therefor.

In column 14, line 5, in Claim 20, delete "a)" and insert -- e) --, therefor.

In column 14, line 32, in Claim 25, delete "substrings:" and insert -- substrings; --, therefor.

Signed and Sealed this

Twenty-first Day of July, 2009

JOHN DOLL
*Acting Director of the United States Patent and Trademark Office*